US011474003B2

(12) United States Patent
Grenzi et al.

(10) Patent No.: US 11,474,003 B2
(45) Date of Patent: Oct. 18, 2022

(54) MONITORING SYSTEM FOR AUTOMATICALLY ESTIMATING AND MONITORING THE CORRECT ALIGNMENT OF THE TRACKS, PARTICULARLY OF THE TRACK CHAINS, AND RELEVANT METHOD

(71) Applicants: Berco S.p.A., Copparo/Ferrara (IT); thyssenkrupp AG, Essen (DE)

(72) Inventors: Francesco Grenzi, Ferrara (IT); Enrico Maggiolini, Ferrara (IT); Piero Bruno, Fossano (IT)

(73) Assignees: BERCO S.P.A., Copparo/Ferrara (IT); THYSSEN KRUPP AG, Essen (DE)

( * ) Notice: Subject to any disclaimer, the term of this patent is extended or adjusted under 35 U.S.C. 154(b) by 252 days.

(21) Appl. No.: 17/015,752

(22) Filed: Sep. 9, 2020

(65) Prior Publication Data

US 2021/0088416 A1    Mar. 25, 2021

(30) Foreign Application Priority Data

Sep. 19, 2019   (EP) .................................... 19425066

(51) Int. Cl.
*G01S 19/14*   (2010.01)
*G01M 17/03*   (2006.01)

(52) U.S. Cl.
CPC ............. *G01M 17/03* (2013.01); *G01S 19/14* (2013.01)

(58) Field of Classification Search
CPC ................................. G01S 19/14; G01M 17/03

USPC ......................................................... 342/465
See application file for complete search history.

(56) References Cited

U.S. PATENT DOCUMENTS

| 6,386,653 | B1 | 5/2002 | Brandenburger |
| 2011/0228506 | A1* | 9/2011 | Chen ...................... H01L 22/32 |
| | | | 361/810 |
| 2016/0129954 | A1 | 5/2016 | Hasselbusch |
| 2016/0311481 | A1 | 10/2016 | Grant |
| 2017/0234775 | A1 | 8/2017 | Finch |
| 2018/0190045 | A1 | 7/2018 | Richard |

FOREIGN PATENT DOCUMENTS

| AU | 2011341674 | A1 * | 6/2013 | ........... B62D 55/088 |
| CN | 105584546 | A  * | 5/2016 | ............. B62D 55/20 |
| GB | 2339947   | A  * | 2/2000 | ............... B60Q 9/00 |
| WO | 2019109191| A    | 6/2019 | |

* cited by examiner

*Primary Examiner* — Harry K Liu
(74) *Attorney, Agent, or Firm* — thyssenkrupp North America, LLC

(57) ABSTRACT

A monitoring system is disclosed for automatically estimating and monitoring the alignment of tracks of a track-type vehicle. The track-type vehicle includes an undercarriage and two tracks. Each track includes a chain with a plurality of chain links and articulated joints. The monitoring system includes at least one undercarriage sensor fixable on the undercarriage, at least one chain sensor fixable on the chain of each of the two tracks, and a processor configured to combine the detections of the sensors to determine the alignment direction of the tracks and to compare the determined direction with a reference alignment direction.

14 Claims, 4 Drawing Sheets

MONITORING SYSTEM FOR AUTOMATICALLY ESTIMATING AND MONITORING THE CORRECT ALIGNMENT OF THE TRACKS, PARTICULARLY OF THE TRACK CHAINS, AND RELEVANT METHOD

CROSS REFERENCE TO RELATED APPLICATION

This application is a U.S. Non-provisional application which claims priority to European Patent Application No. EP 19425066.8, filed Sep. 19, 2019, the entire content of which are incorporated herein by reference.

FIELD

The present disclosure generally relates to a monitoring system and a to method for automatically estimating and monitoring the correct alignment of the tracks during the assembly and the operation of a track-type vehicle.

BACKGROUND

The tracks of a track-type vehicle or machinery generally comprise a pair of parallel chains, wherein each chain is made by means of a continuous sequence of articulated joints of the hinge type, connected, to each other and maintained at a constant distance by means of appropriate rigid connection members called chain links.

The chains also comprise a plurality of bushings and pins interposed between the links to connect their ends, so to form the chains. Particularly, the bushings and the pins form the articulated joints that cooperate with the chain links in order to permit the necessary rotational movement between adjacent chain links.

This permits the articulation of the adjacent chain links when the track rotates, wound around the wheels of the track means.

Additionally, the chain comprises a plurality of track shoes coupled to the chain links in order to form the track area that will be in contact with the floor or ground. Track shoes are coupled to the respective chain links through fixing elements, like for example screws, bolts and so on. Track shoes can be of different types and material on the basis of the specific use of the machine on which they are mounted on.

The rotation of the track permits to the track-type machinery to move on the ground, so as to carry out the many operations for which it is intended.

The above track-type machinery has very important weight as well as many components, and it is often used in extreme condition (mines, etc.). Therefore, all the components are likely subjected to wear with the use, in particular the tracks sustaining the machinery structure.

Specifically, it is of crucial importance that the components making the chains of the tracks stay aligned during the movement of the machine, in the direction of movement. In particular, track chains require to be parallel to each other in order to guarantee stability and integrity of the entire machine, in particular of the undercarriage, on which they are applied to.

For correct alignment of the tracks it is meant that the tracks are parallel to each other and parallel to an ideal alignment direction.

The misalignment of the tracks of a track-type vehicle can occur during the assembly process and/or during the use of the machinery, even if the assembly process was done accurately. Such misalignment can be caused by the wear of components themselves.

Thus, in order to increase life of the machinery it is necessary to ensure the alignment of the track chains, and consequently of the tracks, by accurately monitoring the assembly of their components, as well as monitoring their wearing during the use and the life of the track-type machinery.

Thus, a need exists to provide a monitoring system and a method for automatically estimating and monitoring the correct alignment of the track chains during the assembly and during the operation of track-type vehicles or machinery.

DETAILED DESCRIPTION

Figure 1:
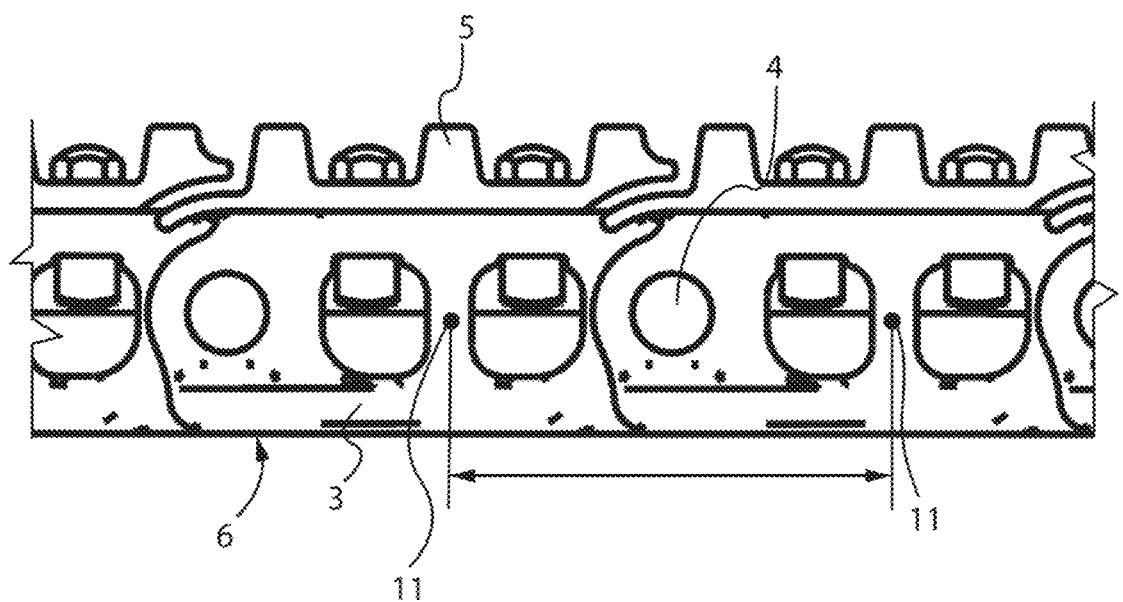
FIG. 1 is a detailed lateral view of a chain of a track including the monitoring system.
Figure 2:
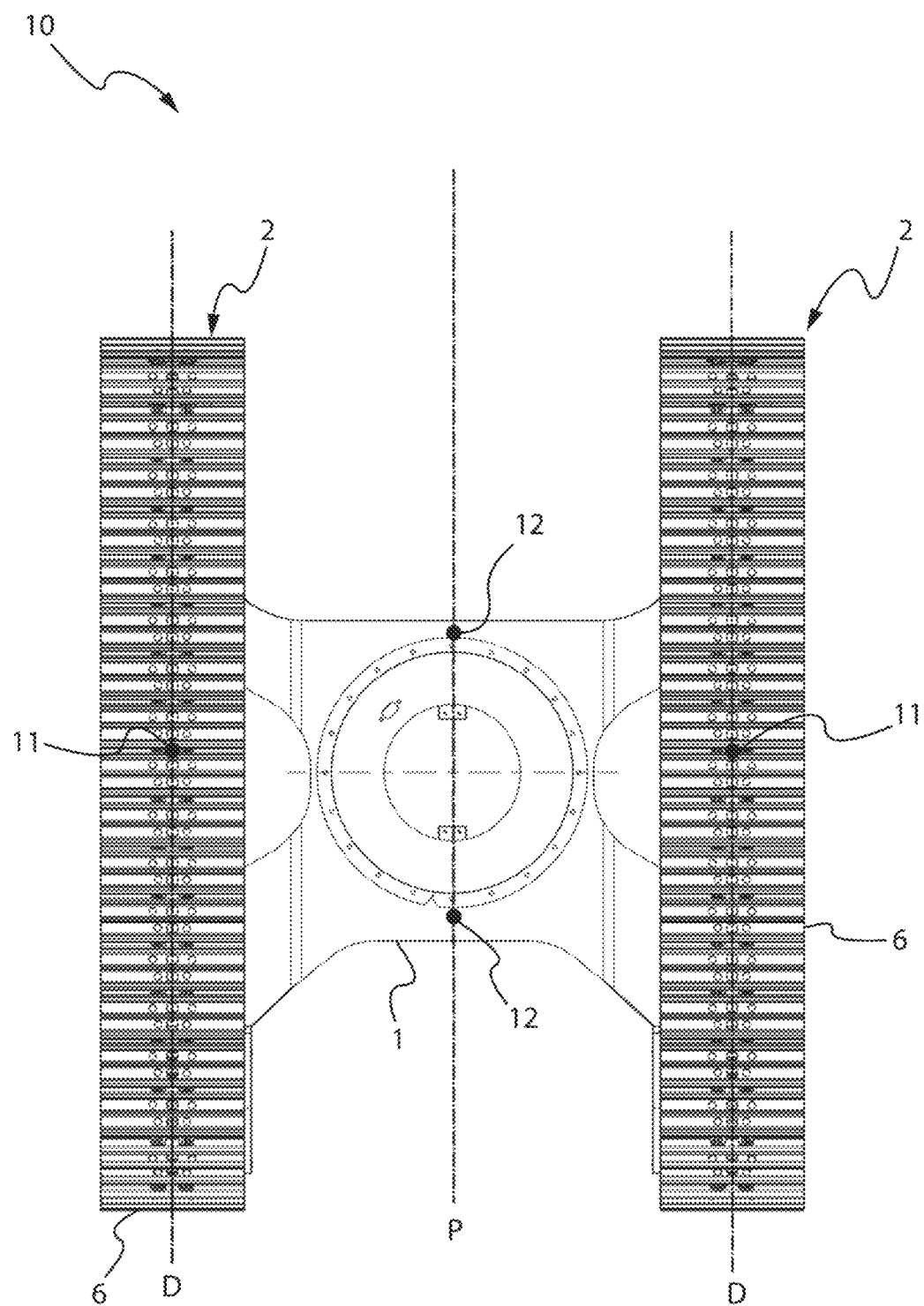
FIG. 2 is a schematic plan view of the bottom of an undercarriage of a track-type vehicle comprising a first embodiment of the monitoring system.
Figure 3:
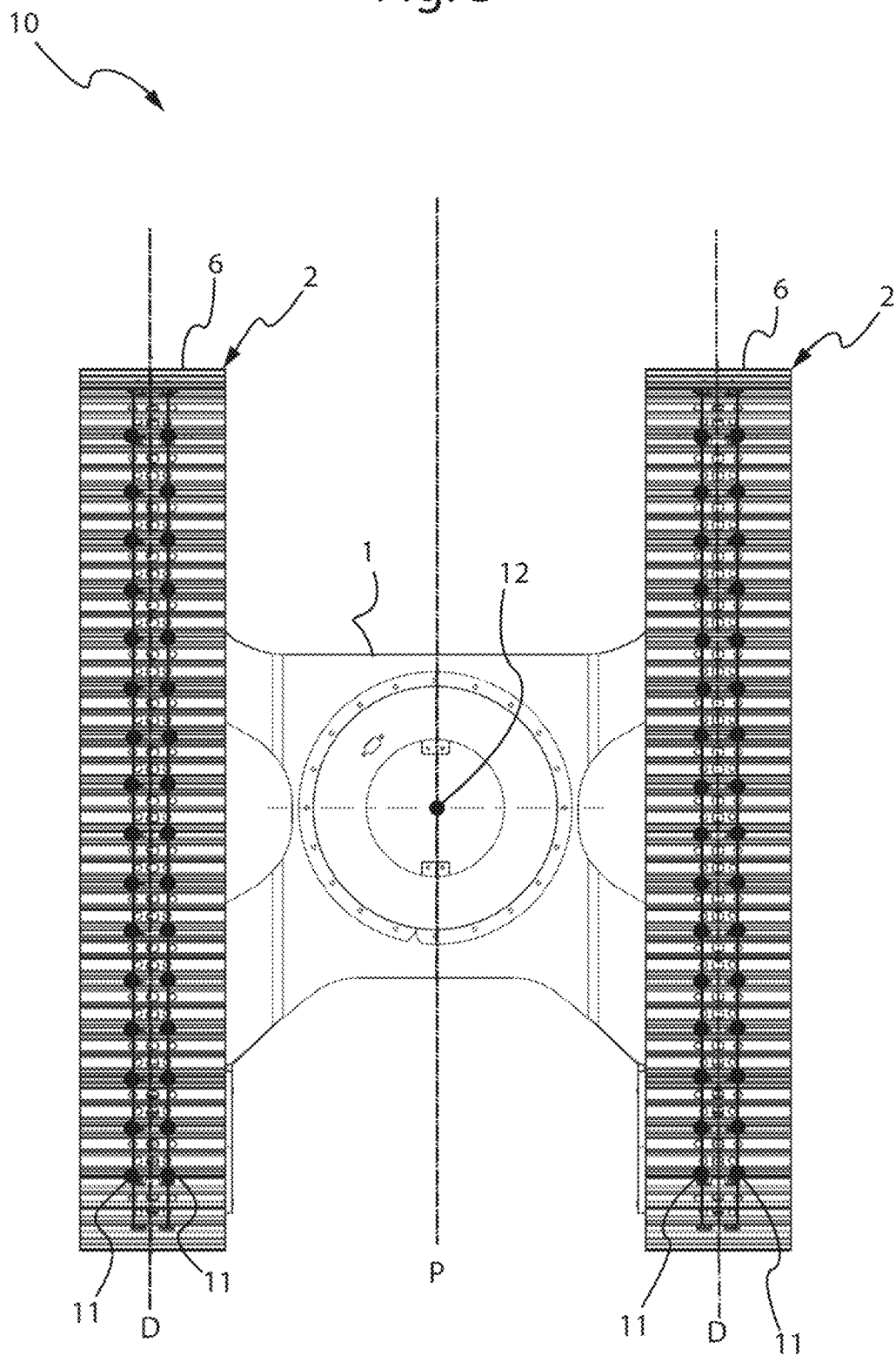
FIG. 3 is a schematic plan view of the bottom of an undercarriage of a track-type vehicle comprising a second embodiment of the monitoring system.
Figure 4:
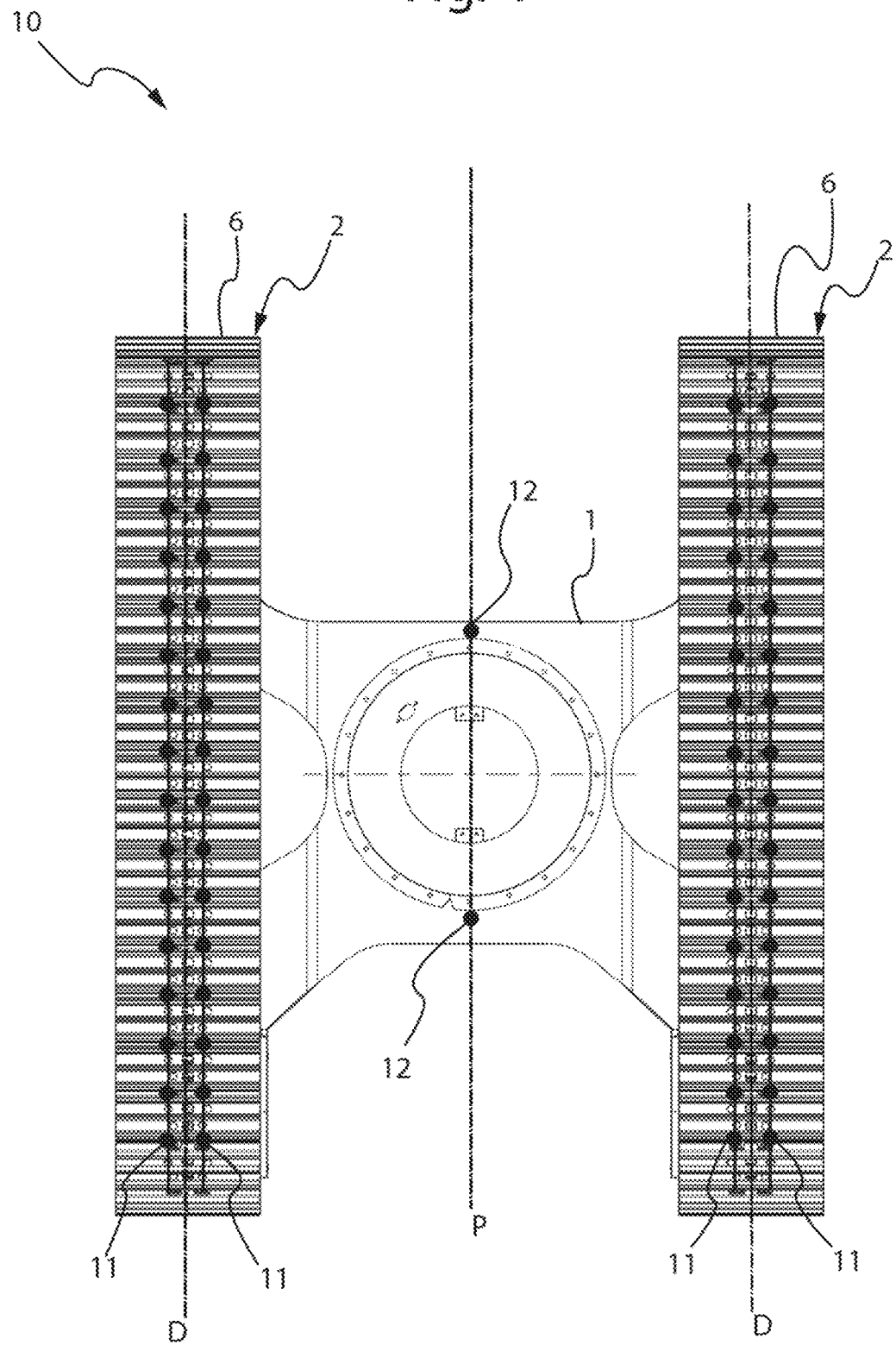
FIG. 4 is a schematic plan view of the bottom of an undercarriage of a track-type vehicle comprising a third embodiment of the monitoring system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention refers to a monitoring system and a to method for automatically estimating and monitoring the correct alignment of the tracks during the assembly and the operation of a track-type vehicle, especially for ground movement, and more particularly for estimating and monitoring the correct alignment of the track chains.

The solution to the problems discussed in the background are accomplished by providing a monitoring system for automatically estimating and monitoring the correct alignment of tracks of a track-type vehicle, said track-type vehicle comprising an undercarriage and two tracks, each one of said track comprising a chain comprising a plurality of chain links and articulated joints; the monitoring system comprising:

at least one undercarriage sensor fixable on said undercarriage;

at least one chain sensor fixable on said chain of each one of said two tracks;

a processor configured for combining the detections of said sensors in order to determine the alignment direction of the tracks and for comparing said determined alignment direction with a reference alignment direction.

The monitoring system, then, allows to automatically monitor the alignment of the tracks with a preset reference alignment direction, during the assembly and also during the operation of the track-type vehicle. In this way, it is also possible to monitor the wearing of the tracks during the use of the track-type vehicle.

Preferably, the monitoring system comprises at least two undercarriage sensors, allowing advantageously more accurate and powerful monitoring of the tracks.

In this way it is possible in a very simple way to detect the position of the chain sensor by triangulation.

Preferably, the at least two undercarriage sensors are fixable to the undercarriage so as to define the reference alignment direction through their position. In this way the reference alignment direction results from the detections of the two undercarriage sensors.

Preferably, the monitoring system comprises at least two chain sensors which can be arranged along a row substantially parallel with respect to the chain, the determined alignment direction of the tracks being the direction of said row. Advantageously, this configuration allows more accurate and precise monitoring of the track chains. The accuracy of the system increases with the number of chain sensors provided.

More preferably, the monitoring system comprises a plurality of chain sensors which can be arranged along two or more rows substantially parallel with respect to the chain. In this configuration, advantageously the determined alignment direction of the tracks will be defined by the average direction of the two or more rows; this will allow to decrease the possible faults or errors of the system, for example in the case of malfunction of a sensor. Moreover as the number of the sensors increases the aliasing errors among the corresponding detections will be reduced.

Preferably, two of said chain sensors can be arranged in corresponding positions on two consecutive chain links or articulated joints, allowing the direct monitoring of the wearing of the articulated joints that can cause the elongation of the chain pitch.

More preferably, the chain sensors can be placed on all the chain links and/or articulated joints in order to provide for very accurate and immediate monitoring of all the components forming the tracks.

Preferably, the undercarriage sensors and/or the chain sensors are configured to act as transmitters and/or receivers, allowing to adapt to the specific embodiment and increase the system applications.

In a preferred embodiment, at least one pair of chain sensors comprises a first chain sensor configured to act as a transmitter or a transceiver and a second chain sensor configured to act as a receiver, allowing the determination of the distance between the chain sensors themselves without the need of the undercarriage sensors detections.

In a further aspect, the present invention relates to a track-type vehicle comprising:
  an undercarriage;
  two tracks, each one of said track comprising a chain comprising a plurality of chain links and articulated joints; and
  a monitoring system as previously described.

In a further aspect the present invention relates to a method for automatically estimating and monitoring the correct alignment of tracks of a track-type vehicle, said method comprising the steps:
  providing a track-type vehicle, as previously described;
  storing in said processor said reference alignment direction;
  determining, through said processor, the alignment direction of the tracks by combining the detections of the at least one undercarriage sensor and the at least one chain sensors;
  comparing, through said processor, said determined alignment direction with the stored reference alignment direction;
  generating, through said processor, an alert signal if said determined alignment direction is not parallel to said reference alignment direction for an angle bigger than a predetermined tolerance angle.

In this way, an operator can be notified about the alignment status of the tracks.

Preferably, the alert signal is generated also if said determined alignment direction varies with respect to an initial determination, allowing the monitoring of the changes of overall shape of the tracks, due for example to wear or loosening of connections, and upcoming faults.

Preferably, in the case of the provision of a plurality of chain sensors, the method comprises the steps:
  determining, through the processor, the reciprocal distance between the at least two chain sensors;
  generating, through the processor, an alert signal if the determined reciprocal distance varies with respect to an initial determination.

In particular, such a monitoring system 10 is aimed at monitoring the status of tracks 2 of a track-type vehicle during assembly and during use, more particularly at estimating and monitoring the correct alignment of the tracks 2.

The track-type vehicle comprises an undercarriage 1 and a couple of tracks 2. Said tracks 2 are substantially identical to each other, and thus in the following specification often only one of them will be described, being understood that the other one is substantially identical.

The components forming the tracks 2 are substantially aligned along an alignment direction that identifies the movement direction of the track-type machinery.

When the tracks are correctly assembled the two tracks 2 are parallel to each other and their alignment direction is parallel to a desired reference alignment direction P.

Each track 2 comprises a chain 6, comprising a plurality of chain links 3 coupled together by articulated joints 4. Additionally, the chain 6 comprises a plurality of track shoes coupled to the chain links 3 through fixing elements, like for example screws, bolts and so on.

The alignment of the components of the chain 6 can be compromised when the assembly did not occur correctly, or during the use of the same machinery causing wear, spoil, and the loosening of the articulated joints 4 connecting the chain links 3, causing the misalignment of the components of the chain 6 from the desired reference alignment direction P.

According to the present invention, the monitoring system 10 comprises:
  at least one undercarriage sensor 12 fixed on the undercarriage 1;
  at least one chain sensor 11 fixed on the chain 6 of each one of the two tracks 2.

The monitoring system 10 advantageously comprises a processor (not illustrated) configured for combining the detections of the sensors 11, 12 in order to determine the alignment direction of the tracks 2 and for comparing the determined alignment direction D with a reference alignment direction P.

The sensors can be for example of resistive or magnetic reluctance or ultrasonic type.

In the embodiment with one undercarriage sensor 12 and one chain sensor 11, the undercarriage sensor 12 is configured to trace over time the position of the chain sensor 11 so as to obtain the trajectory of the chain sensor 11. In this case, the trajectory of the chain sensor 11 is assumed to be the determined alignment direction D of the tracks 2 to be compared with the reference alignment direction P.

The reference alignment direction P can be stored in the memory of the processor by an operator or it can be determined by the processor and then stored in its memory. For example the reference alignment direction P is the direction of a longitudinal axis of the undercarriage 1 that is the desired movement direction of the track-type vehicle.

For example, in the embodiment with one undercarriage sensor 12 and one chain sensor 11 said sensors 11, 12 can be GPS sensors; in this case, the sensors 11, 12 and the processor can be configured for acting as a differential-GPS system. In particular, the processor can be programmed for subtracting the position of the undercarriage sensor 12 from the position of the chain sensor 11 in order to derive their relative motion and then the trajectory of the chain sensor 11.

In a preferred embodiment, the monitoring system comprises two of said undercarriage sensors 12, fixed to the undercarriage. In this embodiment the reference alignment direction P, can be determined by the processor as the direction of the straight line connecting the two undercarriage sensor 12.

In an embodiment, the monitoring system comprises more than two of said undercarriage sensors 12.

In a further embodiment the monitoring system comprises at least two of said chain sensors 11 which can be arranged along a row substantially parallel with respect to the chain 6.

In this case, the at least one undercarriage sensor 12 is configured for detecting the positions of said chain sensors 11 and the processor determines the alignment direction D as the direction of the row along which the chain sensors 11 are aligned.

In a further embodiment, the monitoring system 10 comprises a plurality of the chain sensors 11, which can be arranged along two or more rows substantially parallel with respect to the chain 6. In this case, the processor determines the direction of the two or more rows and then determines the alignment direction D of the tracks 2 as the average direction of the two or more rows.

Based on the number and configuration of the chain sensors 11 provided, the accuracy of monitoring system will vary and different measurements can be accomplished.

By using more than two chain sensors 11, it is possible to monitor the wearing of the tracks; for example, when one or more chain links 3 change from their correct position a discontinuity in the track path is created and the processor will determine an alignment direction D which is not perfectly straight and parallel with respect to the reference alignment direction P.

This allows operators to be aware of the presence of ruined components and to execute a suitable maintenance of the tracks, preventing additional and accelerated wear.

Another embodiment according to the invention provides the use two of said chain sensors 11 arranged in corresponding positions on two consecutive chain links 3 or articulated joints 4. In this way, the measure of the distance between the chain sensors 11 in the direction of the chain 6 allows to monitor the pitch elongation between the components of the chains, given by the wear of the same.

Preferably the use of a chain sensor 11 for each chain link 3 and/or articulated joint 4 allows to provide precise and immediate monitoring of the status of all the components forming the chain 6.

The chain sensors 11 can be positioned on any component of the chains 6. In the embodiment illustrated in FIG. 1, said chain sensors 11 are positioned on the chain links 3. In an embodiment not illustrated the chain sensors 11 are positioned on the bolts connecting the track shoes 5 to the chain link 3.

Preferably the undercarriage sensors 12 are configured to act as a transmitters and/or a receivers.

Preferably, the chain sensors 11 are configured to act as a transmitters and/or a receivers.

For example, in order to measure the pitch elongation, the chain 6 can comprise at least one pair of chain sensors 11, wherein a first chain sensor 11 is configured to act as a transmitter or a transceiver and a second chain sensor 11 is configured to act as a receiver.

The method for automatically estimating and monitoring the correct alignment of tracks of a track-type vehicle, according to the present invention will be described in the following.

After a track-type vehicle has been provided with the monitoring system above described, the method comprises the steps:

storing in the processor the reference alignment direction P;

determining, through said processor, the alignment direction of the tracks 2 by combining the detections of the at least one undercarriage sensor 12 and the at least one chain sensors 11;

comparing, through said processor, the determined alignment direction D with the stored reference alignment direction P;

generating, through said processor, an alert signal if the determined alignment direction D is not parallel to said reference alignment direction P for an angle bigger than a predetermined tolerance angle.

The method according to the present invention can comprise the generation of the alert signal also if said determined direction D varies with respect to a previous determination, for example the determination at the beginning of the operating life of the vehicle.

In this way it is allowed not only to monitor the direction of the tracks 2 alignment with respect with reference alignment direction P, but also the respective alignment of the components of the chains 6 of the tracks 2. In fact, if a component or the connection between the components is subject to wear, the determined alignment direction D will vary from a previous condition for example the condition at the beginning of the operating life of the vehicle.

Additionally, in the case in which the monitoring system is capable of measuring the pitch elongation within the chain the method comprises the steps:

determining, through the processor, the reciprocal distance between the at least two chain sensors 11;

generating, through the processor, an alert signal if the determined reciprocal distance varies with respect to a previous determination, for example the determination made at the beginning of the operating life of the vehicle.

The present invention has been described, for illustrative but not limitative purposes, according to its preferred embodiments, but it is to be understood that variations and/or modifications may be made by an expert in the field, without thereby abandoning the relative scope of protection, as defined in the attached claims.

What is claimed is:

1. A monitoring system for automatically estimating and monitoring the correct alignment of tracks of a track-type vehicle, the track-type vehicle comprising an undercarriage and two tracks, each of the two tracks comprising a chain comprising a plurality of chain links and articulated joints; the monitoring system comprising:
    at least one undercarriage sensor configured to be fixed on the undercarriage;
    at least one chain sensor configured to be fixed on the chain of each one of the two tracks; and
    a processor configured to combine detections of the sensors and determine the alignment direction of the tracks and compare said determined alignment direction with a reference alignment direction.

2. The monitoring system of claim 1 comprising at least two undercarriage sensors.

3. The monitoring system of claim 2 wherein the at least two undercarriage sensors are fixable to the undercarriage so as to define the reference alignment direction.

4. The monitoring system of claim 1 comprising at least two chain sensors which are configured to be arranged along a row substantially parallel with respect to each chain, the determined alignment direction of the tracks being the direction of the row.

5. The monitoring system of claim 4 comprising a plurality of chain sensors which are configured to be arranged along two or more rows substantially parallel with respect to each chain, the determined alignment direction of the tracks being the average direction of the two or more rows.

6. The monitoring system of claim 1 wherein two chain sensors are arranged in corresponding positions on two consecutive chain links or articulated joints.

7. The monitoring system of claim 1 wherein the chain sensors are arranged on all the chain links and/or articulated joints.

8. The monitoring system of claim 1 wherein the undercarriage sensors are configured to act as transmitters and/or receivers.

9. The monitoring system of claim 1 wherein the chain sensors are configured to act as transmitters and/or receivers.

10. The monitoring system of claim 8 wherein at least one pair of chain sensors comprises a first chain sensor configured to act as a transmitter or a transceiver and a second chain sensor configured to act as a receiver.

11. A track-type vehicle comprising:
    an undercarriage;
    two tracks, each of the two tracks comprising a chain comprising a plurality of chain links and articulated joints; and
    the monitoring system of claim 1.

12. A method of automatically estimating and monitoring the correct alignment of tracks of a track-type vehicle, comprising:
    providing a track-type vehicle comprising an undercarriage and two tracks, each of the two tracks comprising a chain comprising a plurality of chain links and articulated joints, and
    a monitoring system comprising:
        at least one undercarriage sensor configured to be fixed on the undercarriage;
        at least one chain sensor configured to be fixed on the each chain of each of the two tracks; and
        a processor configured to combine detections of the sensors and determine the alignment direction of the tracks and compare the determined alignment direction with a reference alignment direction;
    the method comprising:
    storing, in the processor, the reference alignment direction;
    determining, via the processor, the alignment direction of the tracks by combining the detections of the at least one undercarriage sensor and the at least one chain sensors;
    comparing, via the processor, the determined alignment direction with the stored reference alignment direction; and
    generating, via the processor, an alert signal when the determined alignment direction is not parallel to the reference alignment direction for an angle bigger than a predetermined tolerance angle.

13. The method of claim 12 wherein the alert signal is generated also when the determined alignment direction varies with respect to a previous determination.

14. The method of claim 12, comprising:
    determining, via the processor, the reciprocal distance between at least two chain sensors; and
    generating, via the processor, an alert signal when the determined reciprocal distance varies with respect to a previous determination.

* * * * *